UNITED STATES PATENT OFFICE.

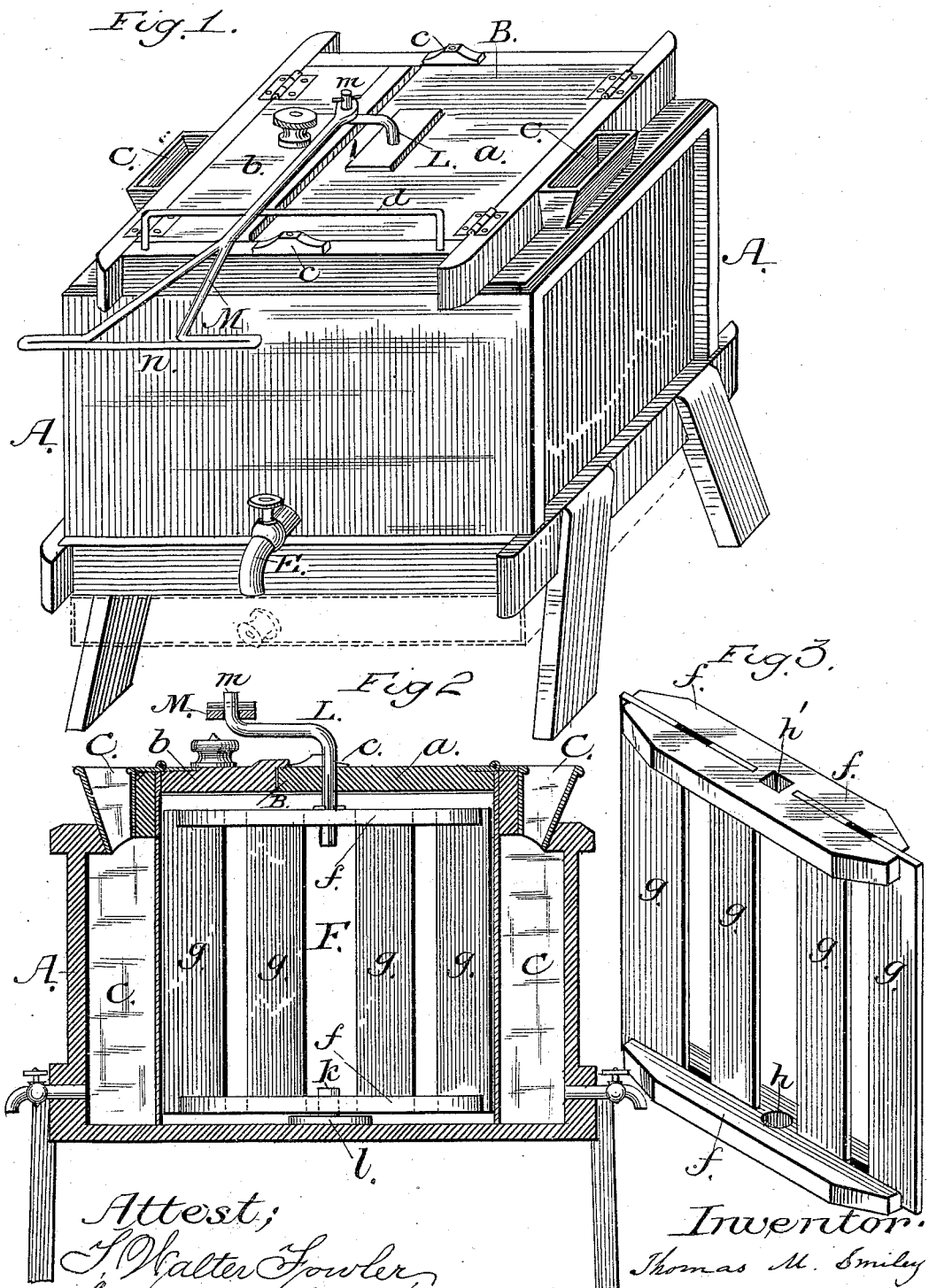

THOMAS M. SMILEY, OF FARMINGTON, MISSOURI.

CHURN.

SPECIFICATION forming part of Letters Patent No. 311,685, dated February 3, 1885.

Application filed April 12, 1884. (No model.)

*To all whom it may concern:*

Be it known that I, THOMAS M. SMILEY, a citizen of the United States, residing at Farmington, in the county of St. Francois and State of Missouri, have invented certain new and useful Improvements in Churns, of which the following is a full, clear, and exact description, reference being had to the accompanying drawings, forming part of this specification, in which—

Figure 1 is a perspective view of a rotary churn with my improvements attached. Fig. 2 is a vertical section of the same. Fig. 3 is a detail of the dasher.

My invention relates to that class of rotary churns in which a single dasher composed of parallel strips is secured to a vertical shaft and operated by a lever which has a bearing on a raised bar secured to the frame; and my invention consists in the novel arrangement, construction, and combination of devices hereinafter more fully set forth.

To enable others skilled in the art to make and use my invention, I will now proceed to describe the exact manner in which I have carried it out.

In the said drawings, A represents the frame or main portion of my churn, which is provided with the cover B. It will be noticed that this cover is formed by the two lids *a* and *b*, which are hinged in the usual manner, the lid *a* being somewhat wider than the lid *b*, and the said lid *a* is provided with a perforation, through which the upper end of a short vertical shaft passes, as will be hereinafter more fully set forth. The frame A is provided with two buttons or clamps, *c*, which securely hold the said lid down upon a projecting ledge or shoulder formed on the frame A and prevents any splashing of the milk from the churn. The peculiar construction of the lid *a* also enables the operator to disconnect the vertical shaft from the dasher, and also to remove the latter from the interior of the churn when it is desired to remove the contents or clean the churn. The lid *b* being smaller in width than the lid *a* enables the operator to raise the said lid and view the contents during the process of churning. The frame A is also provided with a raised bar, *d*, on one side of its upper surface, which acts as a bearing for the outer end of an operating-lever, to be hereinafter more fully set forth. The frame A is provided on two of its sides with chambers C, having sheet-metal plates, as shown, and in these chambers are poured hot or boiling water, which I have found by actual experiment not only heats the body of milk in the churn, but also greatly facilitates the production of the butter.

If desired, I can construct beneath the churn a drawer composed of metal or other suitable material, and in this drawer a portion of the milk can be placed, and with the aid of boiling water or hot coals and a thermometer the exact temperature to be required is ascertained.

The chambers for containing the hot water are each provided with suitable outlets, through which the water can be drawn when the operation of churning is completed, while the frame A is provided with a faucet, E, through which the milk can be drawn, as shown in Fig. 1.

Within the churning-chamber is the dasher F, composed of the upper and lower cross-bars *f f*, which are slotted on each side of the center to receive the upper and lower end of the blades *g*. These blades, it will be noticed, are four in number, arranged parallel to each other, and have spaces between them, the outer blades projecting slightly beyond the end of the cross-bars *f*, so as to more effectually break the globules containing the milk. The cross-bars *f* are each provided at their center with perforations *h h'*, the lower one, *h*, being adapted to receive a projecting pin, *k*, formed on a step, *l*, secured to the bottom of the churn, while the said pin acts as a pivot upon which the dasher revolves. The upper cross-bar, *f*, has its perforation *h'* made square, to receive the squared end of a short vertical shaft, L, which passes through the upper cross-bar and is secured by a key or pin. The shaft L, after passing through the lid *a*, extends upward a short distance, when it is bent at right angles, as shown, while on the outer end is formed another crank portion, *m*, adapted to receive the eye formed on the operating-lever M, which is secured on the said bent portion by a pin or other suitable means. The operating-lever is preferably made of heavy wire formed in one piece, with its outer ends diverging, and formed with a handle, *n*, as shown. This lever, as before stated, rests and slides upon the raised bar $d$, secured to the frame, and permits of an easy revolving motion to the dasher.

Having thus described my invention, what I claim as new, and desire to secure by Letters Patent, is—

1. In a rotary churn, and in combination with the hot-water chambers with metal plates extending from top to bottom, and outlets, the dasher herein described, consisting of the cross-bars $f$, slotted, as shown, to receive the upper and lower ends of the parallel blades $g$, a projecting pin, $k$, formed on a step, $l$, secured to the bottom of the churn, and the means herein described and shown for imparting a rotary motion to the said dasher, as and for the purpose herein set forth.

2. In combination with a rotary churn having a dasher, constructed as shown and described, a short vertical shaft, L, having a squared portion to engage the perforation $h'$ in the upper cross-bar of the dasher, and provided with the bent portions, as shown, and an operating-lever, M, formed of a single piece of wire with suitable handles, and provided with means, as described, for attaching the said lever to the crank-arm $m$, all constructed to operate substantially as herein set forth.

3. In a rotary churn provided with the raised supporting-bar $d$, the operating-lever M, formed of one piece of metal, and having an eye adapted to engage the bent end of a single vertical shaft, having a squared portion on its lower end adapted to enter a perforation formed in the upper cross-bar of a dasher constructed as shown, all constructed to operate substantially as herein set forth.

4. In a rotary churn, the frame A, buttons $c$, cover B, formed by the lids $a$ and $b$, hot-water chambers C, the dasher F, provided with slotted cross-bars $f$, said bars perforated, as shown at $h\ h'$, parallel blades $g$, step $l$, pin $k$, vertical shaft L, provided with bent portions, as shown, lever M, formed with a handle, $n$, and a raised bar, $d$, secured to the top of the churn, and upon which rests the lever, all in combination and arranged to operate as and for the purpose set forth.

THOMAS M. SMILEY.

Witnesses:
GEORGE SMILEY,
EDWARD MATCHETT.